3,035,074
**AMINOCYCLOPENTADIENYL(CYCLO-
PENTADIENYL) IRON**
Alfred C. Haven, Jr., Hancocks Bridge, N.J., assignor to
E. I. du Pont de Nemours and Company, Wilmington,
Del., a corporation of Delaware
No Drawing. Filed July 1, 1953, Ser. No. 365,556
1 Claim. (Cl. 260—439)

This invention relates to the new compound aminocyclopentadienyl(cyclopentadienyl)iron.

Organo-metallic compounds in which the metal is directly attached to a hydrocarbon radical make up an important class of compounds. Well-known examples include tetraethyl lead, the ethyl mercury fungicidal compounds, and the alkyl and aryl derivatives of magnesium, sodium, lithium and the like which are useful in organic syntheses. The first such compound of iron to be discovered was dicyclopentadienyliron, which is disclosed and claimed in U.S. application Serial No. 291,567, now U.S. Patent 2,680,756, of Pauson, filed June 5, 1952. This compound is also known as bis-cyclopentadienyl iron.

Although several derivatives of dicyclopentadienyliron have recently been prepared, the amino derivative has not heretofore been described. Attempts to prepare this compound by nitrating dicyclopentadienyliron and thereafter reducing the nitration product to the amine have not been successful.

According to the present invention, the new compound aminocyclopentadienyl(cyclopentadienyl)iron has been prepared and found to be a yellow, crystalline solid melting at 149–155° C. Its infra-red spectrum shows absorption bands at 2.9 to 3.15, 6.16 and 6.65 microns. The ultraviolet absorption spectrum in methanol shows a maximum at 2830 angstroms, and an extinction coefficient of 4540. The compound is soluble in typical organic solvents such as ethyl ether and petroleum ether and is also soluble as the amine salt in aqueous acids.

Dunitz and Orgel concluded in Nature 171, 121 (1953), that dicyclopentadienyliron has a sandwich-type structure in which the cyclopentadienyl radicals are on opposite sides of the iron atom and are oriented so that their apices do not coincide. This conclusion was based on X-ray diffraction studies. According to Wilkinson et al., in J. Am. Chem. Soc. 74, 2125 (1952), all five positions in each cyclopentadienyl ring in these compounds are equivalent, so that no isomerism is possible with a monosubstituted derivative.

The aminocyclopentadienyl(cyclopentadienyl)iron may be prepared by the hydrolysis or hydrogenation of its benzyl urethane. This latter compound, which may also be called [(benzyloxyformamido)cyclopentadienyl](cyclopentadienyl)iron, is described and claimed in my U.S. application Serial No. 365,557, now abandoned, of even date herewith. It may be prepared from the monocarboxylic acid of dicyclopentadienyliron, which is the subject of U.S. application Serial No. 312,853 of Weinmayr, filed October 2, 1952, now U.S. Patent No. 2,683,157. The monocarboxylic acid is converted to the acid chloride by means of phosphorus pentachloride, and the acid chloride is reacted with sodium azide to yield the corresponding acid azide. Reaction of the azide with benzyl alcohol yields the benzyl urethane of aminocyclopentadienyl(cyclopentadienyl)iron. This preparation is illustrated by the following example:

EXAMPLE A

*Preparation of [(Azidoformyl)cyclopentadienyl](cyclopentadienyl)iron*

13.7 grams of the monocarboxylic acid of dicyclopentadienyliron are stirred with an equal weight of phosphorus pentachloride in 150 ml. dry benzene for two hours at room temperature. The suspension is filtered and concentrated in vacuo to remove the solvent and the phosphorus oxychloride. The residue is dissolved in 100 ml. of acetone and the resulting solution is cooled to 0 to 5° and treated with a solution of 4.0 g. of sodium azide in a few ml. of water. The reaction mixture is allowed to stand at room temperature for one-half hour and then poured into 600 ml. of cold water. The solid which precipitates is separated by filtration, pressed dry on the filter and then extracted with three 150 ml. portions of cold ether. The ether extracts are decolorized with activated charcoal, dried over magnesium sulfate and concentrated in vacuo at room temperature to give the desired product, which melts at 74–75°.

*Analysis.*—Calcd. for $C_{11}H_9FeON_3$: C, 51.80; H, 3.56; N, 16.48. Found: C, 50.8, 51.5, 52.4, 51.5; H, 3.44, 3.36, 3.49, 3.91; N, 16.5, 16.7, 16.8, 17.0.

The infra-red absorption spectrum shows strong absorption at 4.45 and 5.88 microns.

*Preparation of [(Benzyloxyformamido)cyclopentadienyl](cyclopentadienyl)iron*

A solution of 0.85 g. of [(azidoformyl)cyclopentadienyl](cyclopentadienyl)iron in 15 ml. of benzyl alcohol is heated gradually in an oil bath to 200°, the process requiring about 45 minutes. There is a noticeable gas evolution at 100–150°. The solution is concentrated in vacuo to an oil which crystallizes on stirring in a mixture of ether and petroleum ether to give material melting at 100 to 105°. After two recrystallizations from a mixture of ether and petroleum ether the [(benzyloxyformamido)cyclopentadienyl](cyclopentadienyl)iron has a melting point of 112–113° C.

*Analysis.*—Calcd. for $C_{18}H_{17}NO_2Fe$: C, 64.5; H, 5.11; N, 4.18. Found: C, 63.7, 63.9; H, 5.18, 5.32; N, 4.6, 4.9.

The infra-red absorption spectrum shows bands at 3.0, 5.9 and 6.45 microns.

The preparation of the compound of this invention is illustrated in the following examples.

EXAMPLE 1

A suspension of 0.80 g. of [(benzyloxyformamido)cyclopentadienyl](cyclopentadienyl)iron in 25 ml. of 10% aqueous potassium hydroxide is refluxed under nitrogen for 6 hours. The cooled suspension is extracted with three 20 ml. portions of ether. The extracts are combined and extracted with two 10 ml. portions of cold 6 normal hydrochloric acid. The combined acid extracts are rendered strongly alkaline with excess 25% aqueous potassium hydroxide and the resulting suspension is extracted with three 20 ml. portions of ether. The combined extracts are dried over solid potassium hydroxide and then over magnesium sulfate, and then concentrated in vacuo to a yellow, crystalline solid, melting at 140–143°. After two recrystallizations from a mixture of ether and petroleum ether, the aminocyclopentadienyl(cyclopentadienyl)iron melts at 149–151°. It is soluble in 6 normal hydrochloric acid and insoluble in (and reprecipitated by) aqueous potassium hydroxide.

*Anaylsis.*—Calcd. for $C_{10}H_{11}NFe$: C, 59.73; H, 5.52; N, 6.97. Found: C, 59.5, 59.6; H, 5.19, 5.09; N, 6.9, 7.2.

The infra-red spectrum shows absorption bands at 2.9–3.15, 6.16, 6.65 microns. The ultraviolet absorption spectrum in methanol shows a maximum at 2830 A, with an extinction coefficient of 4540.

EXAMPLE 2

A suspension of 4.7 g. of [(benzyloxyformamido)cyclopentadienyl](cyclopentadienyl)iron and one teaspoon of Raney nickel catalyst in 100 ml. of methanol is hydrogenated at 75° and 100 p.s.i. for 4 hours. The catalyst is separated by filtration and the filtrate concentrated in vacuo to give 2.7 g. of aminocyclopentadienyl(cyclopentadienyl)iron, melting at 135–142°. On recrystallization it melts at 151–155° C. A mixed melting point with a sample of the amino compound obtained by hydrolysis as in Example 1 shows no depression.

Aminocyclopentadienyl(cyclopentaidenyl)iron is a useful intermediate in the preparation of dyestuffs and also has anti-oxidant properties. The presence of the amino group attached to the dicyclopentadienyliron structure permits conversion into other useful compounds, since a large number of other materials can react with the amino group.

What is claimed is:
1. Aminocyclopentadienyl(cyclopentadienyl)iron.

References Cited in the file of this patent
UNITED STATES PATENTS

| | | |
|---|---|---|
| 2,680,756 | Pauson | June 8, 1954 |
| 2,683,157 | Weinmayr | July 6, 1954 |

OTHER REFERENCES

Woodward: J. Am. Chem. Soc., vol. 75, p. 3458–3459. July 1950.